United States Patent [19]
Bloss

[11] Patent Number: 6,089,102
[45] Date of Patent: *Jul. 18, 2000

[54] APPARATUS FOR MEASURING THE VOLUME OF FLOWING MEDIA AND A CORRESPONDING METHOD

[75] Inventor: Hans Ulrich Bloss, Nuremberg, Germany

[73] Assignee: Tokheim Corporation, Fort Wayne, Ind.

[ * ] Notice: This patent issued on a continued prosecution application filed under 37 CFR 1.53(d), and is subject to the twenty year patent term provisions of 35 U.S.C. 154(a)(2).

[21] Appl. No.: 08/925,864

[22] Filed: Sep. 9, 1997

[30] Foreign Application Priority Data

Jan. 29, 1997 [DE] Germany .......................... 197 03 243

[51] Int. Cl.$^7$ ................................. G01F 1/86; G01F 3/04
[52] U.S. Cl. ........................... 73/861.03; 73/261; 702/46
[58] Field of Search ................................ 73/261, 861.03, 73/1.27, 1.34, 861.77; 702/45, 46

[56] References Cited

U.S. PATENT DOCUMENTS

| | | | |
|---|---|---|---|
| 3,818,901 | 6/1974 | Sanctuary et al. | 73/195 |
| 3,974,693 | 8/1976 | Hardies | 73/861.28 |
| 4,176,337 | 11/1979 | Aechter et al. | 73/861.26 |
| 4,432,243 | 2/1984 | Lowell et al. | 73/861.31 |
| 4,628,743 | 12/1986 | Miller et al. | 73/861.95 |
| 4,773,253 | 9/1988 | Francisco | 73/32 R |
| 4,887,469 | 12/1989 | Shoptaw | 73/861.77 |
| 4,969,365 | 11/1990 | StrigArd et al. | 73/861.03 |
| 5,440,925 | 8/1995 | Padden et al. | 73/253 |
| 5,447,062 | 9/1995 | Köpl et al. | 73/261 |
| 5,497,329 | 3/1996 | Tang | 73/118.2 |
| 5,526,685 | 6/1996 | Davis | 73/262 |
| 5,574,229 | 11/1996 | Castillo | 73/861.78 |
| 5,656,784 | 8/1997 | Butch | 73/861.03 |

FOREIGN PATENT DOCUMENTS

| | | | |
|---|---|---|---|
| 0 326 380 A1 | 1/1989 | European Pat. Off. | G01F 7/12 |
| 19513781A1 | 4/1995 | Germany | G01F 3/10 |

*Primary Examiner*—Harshad Patel
*Attorney, Agent, or Firm*—Randall J. Knuth

[57] ABSTRACT

An apparatus and a method of measuring the volume of flowing media, especially of fuel, by means of a screw spindle volumeter, the method comprising the following steps: detecting the revolutions of a screw spindle by means of a sensor and producing pulses whose time sequence is representative of the angular speed of the screw spindle; repeatedly measuring the period of time between successive pulses; selecting, in dependence upon the respective period of time measured, a volume value predetermined for said period of time, said volume value being representative of the volume flowing through the volumeter per predetermined revolution angle of the spindle at the respective angular speed of the spindle; adding the volume values which have successively been selected for various time period measurements, and producing and preferably displaying a total volume value that is based on the sum obtained during the whole volume measurement by continuously adding the volume values.

19 Claims, 4 Drawing Sheets

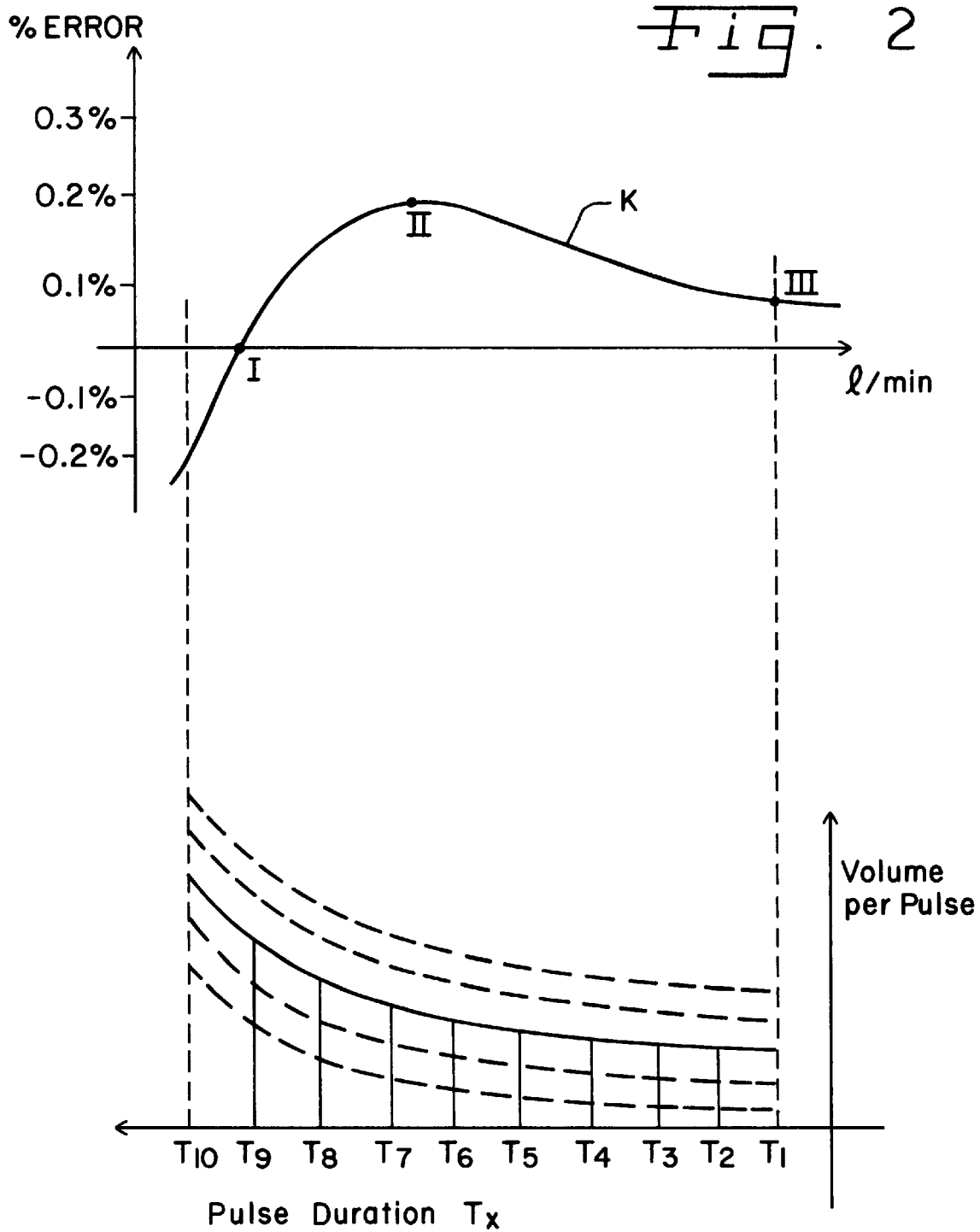

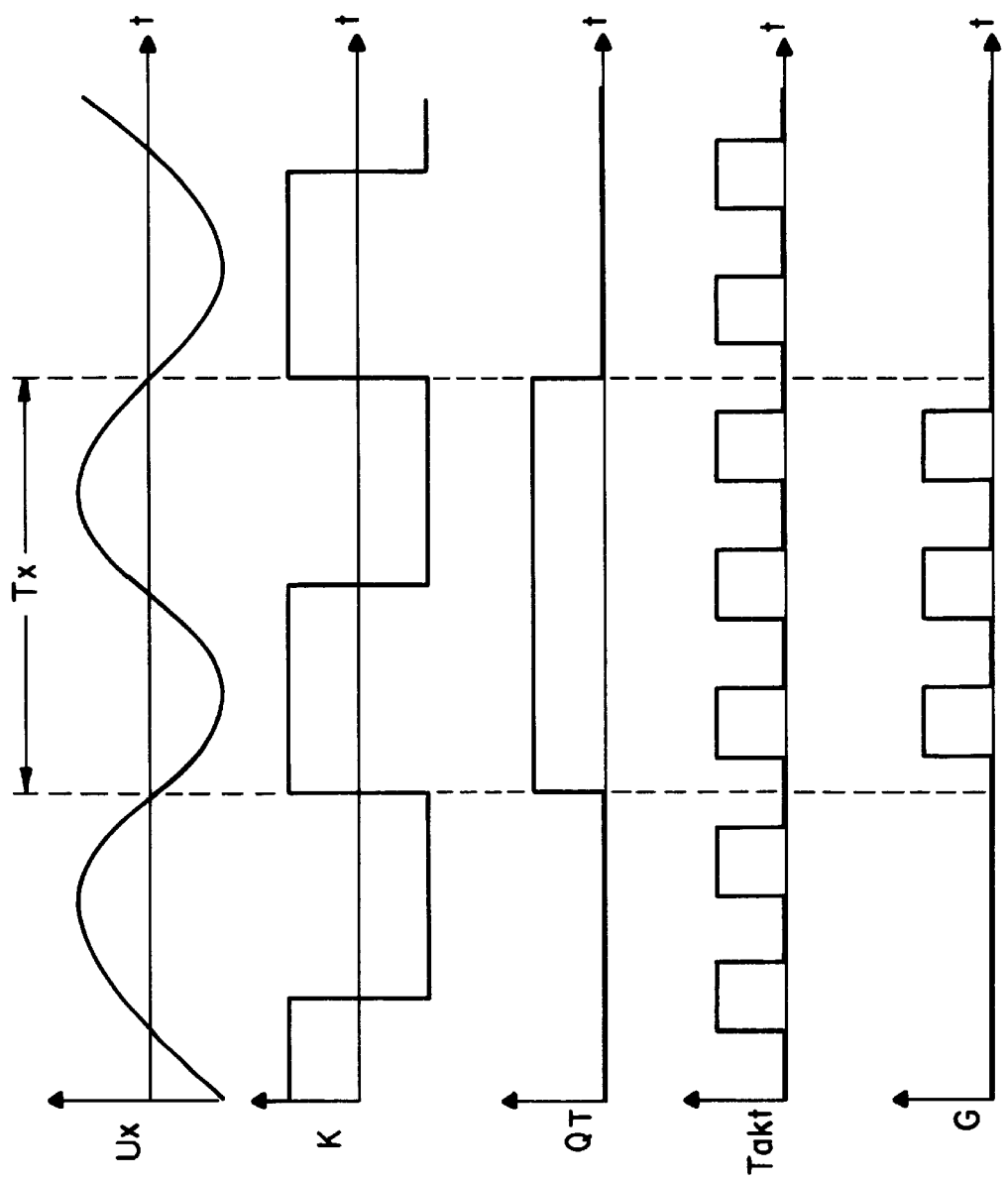

APPARATUS FOR MEASURING THE VOLUME OF FLOWING MEDIA AND A CORRESPONDING METHOD

BACKGROUND OF THE INVENTION

1. Field of the Invention

The present invention refers to an apparatus for measuring the volume of flowing media as well as to a corresponding method and, in particular, it refers to an apparatus for measuring the volume of fuel in gasoline pumps of motor vehicle filling stations.

2. Description of the Related Art

A known type of apparatus for such volume measurements comprises a housing including at least two partially merging longitudinal bores, the axes of which are parallel, in which multiple-thread, interengaging screw spindles are supported in a freely rotatable manner. Said apparatus further comprising at least one sensor by means of which the number of revolutions of at least one of the spindles is detected. Examples of such apparatuses are known from EP 0 572 621 B1, DE 195 13 781 A1, DE 44 23 461 as well as from DE 42 08 869 A1.

One problem arising in connection with screw spindle volumeters is that, taking as a basis the number of spindle revolutions detected by the sensor in the course of a fuelling process, it is not possible to draw exact conclusions with regard to the actually tanked fuel volume. This is especially due to the fact that, when the flow of fuel increases or decreases at the beginning or at the end of a fuelling process, the amount of fuel flowing through the volumeter is larger than the actual amount detected on the basis of the respective number of spindle revolutions. The cause of this behavior is a production-dependent, non-avoidable gap between the spindles and the walls of the longitudinal bores so that parts of the tanked fuel volume can pass through the volumeter without causing a spindle revolution that corresponds to these volume fractions.

On the basis of FIG. 2, the resultant effect on the accuracy of the volume measurement is shown in a graphical representation.

Over the abscissa of the diagram shown, the amount of fuel flowing through the volumeter is shown in the unit l/min. Along the ordinate, the error is plotted in percent, which originates from the deviation of the actually tanked fuel amount from the measured fuel amount. At the zero passage of curve K (point I), a condition has been reached where the measured fuel volume corresponds to the actually tanked fuel volume. At the beginning of the fuelling process, i.e. in a region on the left-hand side of the zero passage (point I), a negative error is caused, said negative error expressing the magnitude of the amount of tanked fuel that could not be detected by the sensor although it flowed through the volumeter. At very high flow velocities, i.e. from point III onwards, for example, the measurement takes place with an approximately constant small positive error, i.e. the amount of fuel measured is only slightly larger than the amount that actually flowed through the volumeter. Between points I and III, an increase in the positive error appears, the excessive amount displayed per volume unit tanked reaching its maximum at point II.

In order to cope with this situation, it has been suggested in EP 0 572 621 B1 that the pulses provided by the sensor should be changed in frequency during the fuelling process in a pulse shaper stage in dependence upon the flow velocity of the fuel, i.e. in dependence upon the location on the abscissa of FIG. 2, so as to achieve a linearization before the pulses reach the actual counter by means of which a total count is ascertained, said total count being converted into a tanked (measured) fuel volume via a fixed relation. It follows that, according to the teaching of EP 0 572 621 B1, pulses supplied by the sensor are still counted, although these pulses are changed on their way to the counter within the pulse shaper stage so as to achieve the above mentioned linearization.

SUMMARY OF THE INVENTION

Starting from the hitherto known means for measuring the volume of flowing media, it is the object of the present invention to provide a suitable apparatus as well as a method by means of which the linearization required due to the dependence of the measurement error on the flow velocity is achieved in a precise and simple manner.

This object is, on the one hand, achieved by an apparatus for measuring the volume of flowing media, preferably of fuel, comprising a housing including at least two partially merging longitudinal bores, the axes of which are parallel and in which preferably multiple-thread, interengaging screw spindles are supported in a freely rotatable manner. At least one sensor means which responds to the revolutions of one of said screw spindles and provides pulses whose time sequence represents the instantaneous angular speed of the spindle is disposed in the unit. The apparatus additionally comprises means for measuring intervals between the pulses supplied by the sensor means.

A means is included for storing an empirically determined correlation between the flow velocity of the medium flowing through the apparatus and a pulse generation caused in the sensor means by the flow of medium.

A means is also included for providing different volume values, in each case on the basis of the pulse interval measured by the pulse interval measuring means and on the basis of the correlation between flow velocity and pulse generation stored in the storage means, the volume value provided being a measure of the volume flowing through the apparatus between successive pulses.

An additional means is further included for adding the values successively provided by the providing means so as to obtain a total volume value which is the decisive value for the volume measurement.

The object of the invention is also achieved by a method of measuring the volume of flowing media, especially of fuel, by means of a screw spindle volumeter, the method comprising the following steps:

detecting the revolutions of a screw spindle by means of a sensor and producing pulses whose time sequence is representative of the angular speed of the screw spindle;

repeatedly measuring the period of time between successive pulses;

selecting, in dependence upon the respective period of time measured, a volume value predetermined for said period of time, said volume value being representative of the volume flowing through the volumeter per predetermined revolution angle at the respective angular speed of the spindle; and adding the volume values which have successively been selected for various time period measurements, and producing and preferably displaying a total volume value that is based on the sum obtained during the whole volume measurement by continuously adding the volume values.

BRIEF DESCRIPTION OF THE DRAWINGS

In the following, preferred embodiments of the present invention are explained in detail making reference to the individual drawings enclosed, in which:

FIG. 2 shows a diagram for explaining the error occurring in the case of spindle volumeters;

FIG. 3 shows time diagrams for explaining a preferred measurement method;

FIG. 4 shows a further diagram for explaining the principle of the measurement method according to the present invention;

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
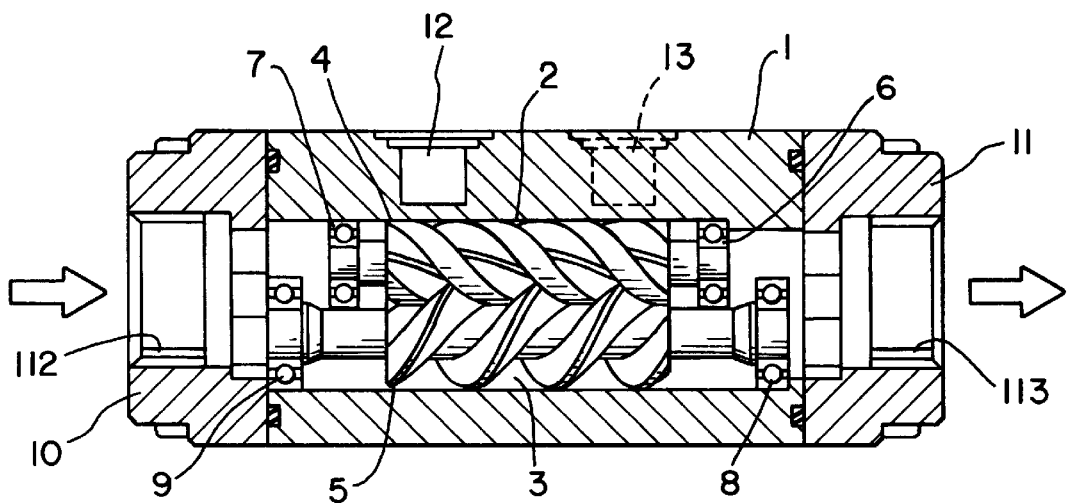
FIG. 1 shows a longitudinal section through a preferred embodiment of the mechanical part of the apparatus according to the present invention.

FIG. 1 shows a preferred embodiment of the mechanical part of the apparatus for measuring the volume of flowing media, especially of fuel. The fundamental structural design of this mechanical part still corresponds to known screw spindle volumeters, i.e. to the screw spindle volumeter according to EP 0 572 621 B1, by way of example. The known features of this structural design are, however, briefly explained so as to make the present invention more easily understandable.

In a cylindrical housing 1 comprising two longitudinal bores 2 and 3, which extend through part of said housing 1 in the longitudinal direction thereof, two multiple-thread screw spindles 4 and 5 are rotatably supported, each by means of ball bearings 6, 7 and 8, 9, respectively. The housing 1 is delimited by a flow-in flange 10 on one side thereof, the fuel to be measured flowing in through said flow-in flange 10 in the direction of measurement, and by a discharge flange 11 on the other side thereof, the measured fuel flowing off through said discharge flange 11.

In addition, at least one sensor 12 is provided so as to be able to detect the revolutions of at least one of said screw spindles for the purpose of volume determination. If it is necessary to detect the direction of flow, it is also possible to provide two or more sensors 12, 13 which are displaced in phase relative to one another. The position and the nature of the preferably used sensors differ from the hitherto known prior art and represent an independent aspect of the present invention. The arrangement and the nature of the preferably used sensor or sensors will be described in detail hereinbelow, after the explanation of the main aspect of the present invention, i.e., the aspect of achieving an improved linearization, which will be explained hereinbelow on the basis of an embodiment.

As has already been mentioned, the volume is measured by detecting the spindle revolutions by means of a sensor. The sensor, which fulfills the function of a revolution detector, can, for example, consist of a variable-inductance pick-up, an optical sensor or e.g., a Hall sensor. The sensor used will produce a measuring voltage $U_x$ which is schematically shown in FIG. 3(a) and which is converted into a square-wave voltage preferably e.g., by means of a Schmitt trigger, said square-wave voltage being shown e.g., in FIG. 3(b).

In the simplest case, a sensor circuit is used that generates one period cycle during one full revolution of the spindle, this being outlined in FIG. 3(a) and 3(b) by $T_x$. If a sensor circuit is used in the case of which a plurality of voltage rises is generated during one full revolution of the spindle, one full revolution of the spindle will be represented by a corresponding number of periods $T_x$. In this case, the resolution of the circuit is not limited to full spindle revolutions, but is refined appropriately.

In order to make the present invention more easily understandable, it will be assumed hereinbelow that the period duration $T_x$ shown corresponds to one full revolution of the spindle. By counting the rectangles shown in FIG. 3(b), e.g. by counting the rising edges during a fuelling process, conclusions with regard to the volume tanked can be drawn, as has already been mentioned hereinbefore.

One main aspect of the present invention is based on the finding that, on the basis of such a counting principle, it is impossible to achieve a satisfactory linearization for compensating the effects that have been described in connection with FIG. 2.

According to a main aspect of the present invention, the pulses supplied by the sensor are therefore no longer counted and converted into a corresponding volume, but the period durations between the pulses are measured. The pulses supplied by the sensor, which are shown in FIG. 3(b) by way of example, have different period durations during the fuelling process. At the beginning of the fuelling process, i.e. when flow velocities are low, the spindle will rotate slowly, and this will result in long period durations $T_x$. During the fuelling process, a maximum flow velocity will be reached, and this will result in correspondingly shorter period durations $T_x$. At the end of the fuelling process, the period durations will slow down again. According to the teaching of the present invention, it is suggested that the representation of the fuelling behavior in the period durations should be used for error-corrected volume determination.

In FIG. 3, the period duration measurement is indicated in that a counting clock is generated in the course of a pulse signal $Q_T$, by means of which the period duration is detected, and in that the number of pulses illustrated by signal G is used as a measure of the period duration $T_x$ measured. FIGS. 3(c)–(e) illustrate this graphically, where FIG. 3(c) illustrates a measured period cycle of the sensor circuit ($T_x$), FIG. 3(d) illustrates a measure of time periods of a counting clock and FIG. 3(e) illustrates the combination of the period $T_x$ and the time periods which occur during the period $T_x$.

Making reference to FIG. 2, a fuelling process will start with a flow rate of 0 l/min and continue until the maximum flow rate, e.g. at point III of curve K, has gradually been reached. At the end of the fuelling process, the flow rate will decrease again down to 0 l/min. This increase and decrease of the flow rate corresponds to an increase and decrease of the angular velocity of the spindle and, consequently, to an increase and decrease in the period duration $T_x$ supplied by the sensor.

FIG. 4 elucidates this correlation again schematically. The pulse duration $T_x$ is plotted above the abscissa to the left, and the volume flowing through the volumeter per pulse is plotted along the ordinate. When FIG. 4 is taken into account in combination with FIG. 2, it can be seen that, at the beginning of a fuelling process, i.e. when a small volume per minute is tanked, the pulse duration $T_x$ is long and that it decreases in proportion to an increase in the flow velocity. The volume delivered per pulse is, however, much larger in the case of short period durations, i.e. when the spindle is rotating slowly, than under stable operating conditions at high flow velocities. As has already been mentioned hereinbefore, this is partly due to the fact that, at low flow velocities, part of the total volume flows past the spindles and is therefore not detected by the measurement. At high flow velocities, however, this effect virtually no longer appears so that the pulses delivered by the sensor represent an almost exact measure of the volume flowing through the volumeter. In FIG. 4, this is outlined on the basis of an approximately unchanging tanked quantity per pulse for short period durations (e.g. $T_1$), i.e. for high flow velocities.

It follows that, by measuring the period duration $T_x$, it can be recognized which point on the curve shown in FIG. 4 (e.g. $T_1$–$T_{10}$) is present at the time in question, and, consequently, it can be recognized how much fuel per pulse actually flows through the volumeter in this situation.

From the technical point of view, a measurement of this type can, for example, be realized by producing with the aid of suitable measurements a table in which a correlation between the period durations $T_x$ measured and the amounts of fuel which actually flowed through the volumeter in the respective situations is recorded. When the period duration is constantly supervised, the volume which is the correct volume at the time in question can always be read from the said table and added to volumes which were already read from said table before. In this way, an accumulated total volume is obtained at the end of the fuelling process, the total volume being composed of volume fractions which may have had different sizes per pulse in accordance with the varying period durations $T_x$.

The volume value read can be representative of the flow velocity in question and, when multiplied by the period duration, it can be converted into an absolute volume value.

An essential further advantage of the solution according to the present invention is to be seen in the fact that different tables or sets of tables of this type can be used for different situations.

For example, an increase in the viscosity of the tanked fuel, or, expressed in a general formulation, of the medium flowing through the volumeter, will result in a reduction of the gap losses, and this will result in a reduction of the measuring error explained on the basis of FIG. 2. Hence, a new set of tables will preferably be produced for the respective higher viscosity, and, in a situation where an increase in viscosity exists, said new set of tables will be read in accordance with the pulse durations measured. The above also applies mutatis mutandis when the temperature changes, although the viscosity of the fuel remains the same.

Expressed more generally, it is possible to prepare in dependence upon the nature of the measured medium, the viscosity, the temperature and almost other arbitrary influencing factor a set of tables which is specially adapted to the situation in question and which is then read, based on the measured pulse durations $T_x$, in a time-correct manner in the respective situation so as to obtain an accumulated total volume. On the basis of FIG. 4, the presence of various sets of tables is graphically indicated by the fact that, instead of a single curve, a group of curves consisting of broken lines is shown and that each individual curve corresponds to a specific measurement situation (viscosity, temperature and nature of the medium).

Figure 5:
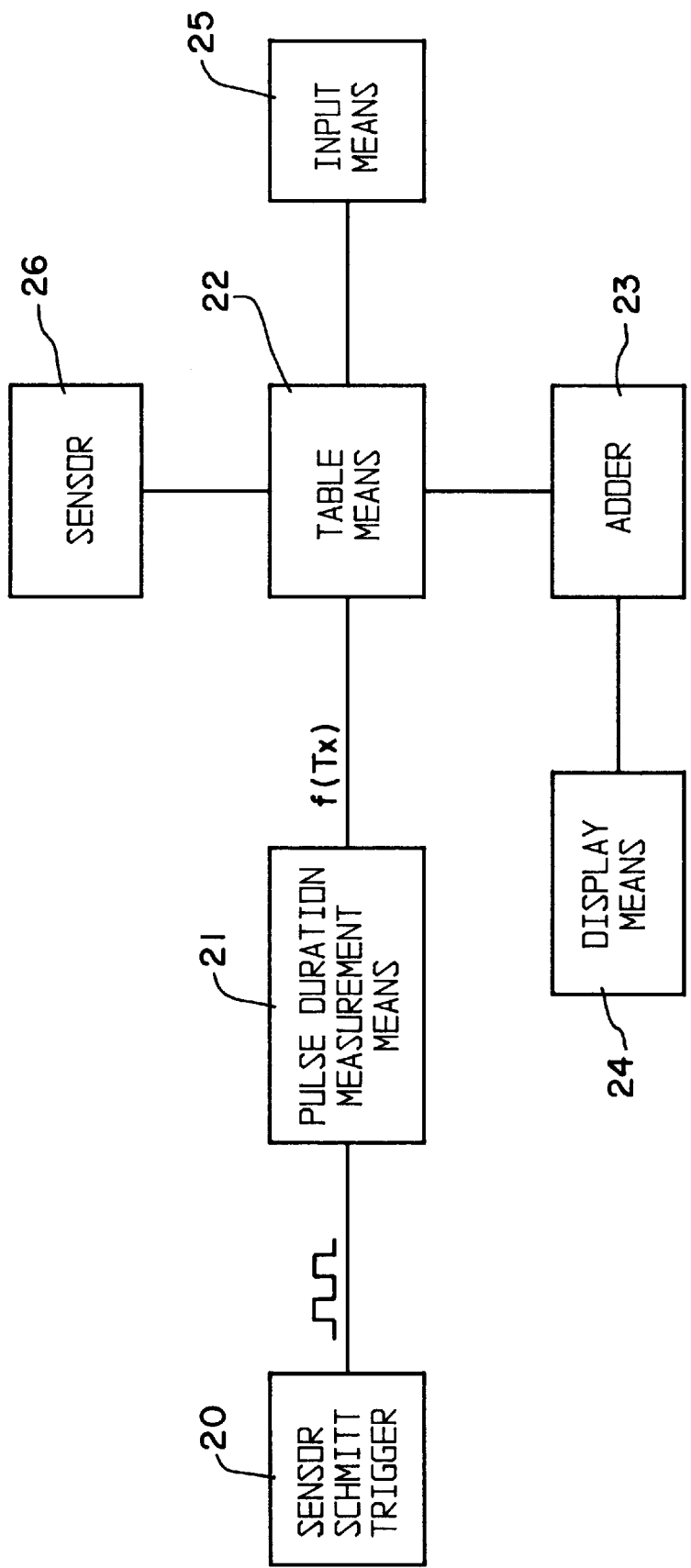
FIG. 5 shows a schematic block diagram of a circuit used for carrying out the measurement method.

FIG. 5 shows a schematic block diagram of a circuit by means of which the measurement and calculation described hereinbefore can be carried out. A sensor, which has preferably integrated therein a Schmitt trigger 20, supplies a squarewave pulse to a pulse duration measurement means 21 in accordance with the detected spindle revolutions. Within said pulse duration measurement means 21, the pulse duration $T_x$ is determined, the respective output signal of the pulse duration measurement means being used for addressing a table means 22. The value read from said table means 22 on the basis of a measured period duration $T_x$ is a measure of the volume per pulse flowing through the volumeter in the course of the respective pulse duration; in an adder 23, said value is added to the volumes which have already been read previously so that, when the whole measurement process has been finished, a total volume is obtained that can be displayed on a display means 24. As has already been mentioned, different sets of tables for different operating conditions can be filed in said table means 22. A change-over between the individual table sets is then effected in accordance with the prevailing operating conditions. For different media to be measured, different groups of table sets can be filed. Separate table sets for gasoline as well as for Diesel fuel or other flowable media can be filed. For a specific medium, different table sets can be provided in accordance with the special viscosity of said medium, the prevailing temperature, etc. The viscosity can preferably be adjusted via an input means 25; in the table means 22, said adjustment has the effect that a suitable table set is selected. Furthermore, a temperature sensor 26 is preferably provided, which, when the system is in operation, constantly examines and detects the temperature prevailing in the flowing medium and which, in response to temperature changes, causes a change-over to a new table set which is suitable for the new temperature.

With the exception of the sensors, the circuit shown in FIG. 5 as a schematic block diagram is preferably provided on a single printed circuit board.

Figure 6:
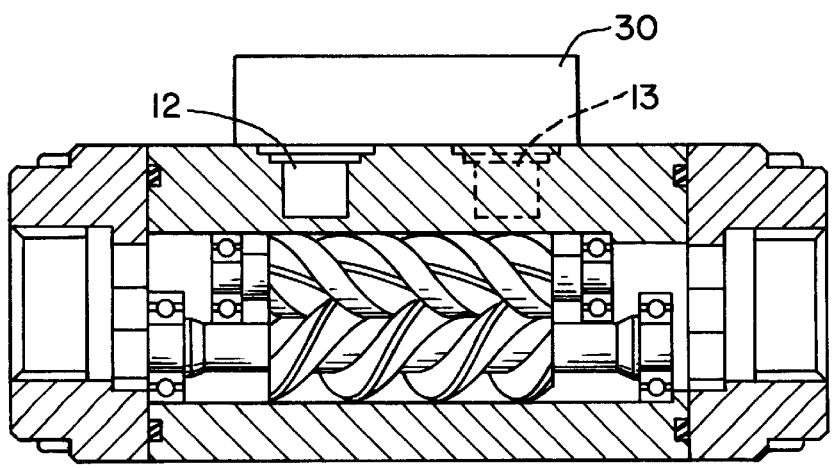
FIG. 6 shows a longitudinal section through an embodiment of the volumeter according to the present invention for explaining additional features according to the present invention.

FIG. 6 shows a solution possibility in the case of which a molded module 30, in which the essential parts of the electronics are accommodated, is arranged directly on the housing 1 of the volumeter. The sensor 12, or the sensors 12, 13 is/are preferably arranged below the module 30 so that, on the whole, a compact structural design is obtained. The essential part of the circuit shown in FIG. 5 is, of course, preferably completely implemented as a single microcontroller that has been integrated in the module 30. Like the sensors 12 and 13, respectively, also the temperature sensor shown in FIG. 5 can be attached to the housing of the volumeter.

On the basis of FIG. 6, a further independent inventive feature of the present invention will be explained hereinbelow. As outlined in said figure, the bore, which has inserted therein the sensor 12, does not intersect the longitudinal bores used for the spindles. Hence, sensor 12 does not communicate with the wet chamber, and the detection of the spindle revolutions takes place through the housing layer remaining below the sensor, said housing layer having the thickness d. In accordance with the present invention it has been discovered that, especially in cases where an aluminum housing and a Hall sensor are used, detection of the spindles is possible through a housing layer having a thickness of up to 5 mm. In order to achieve a good measurement effect, a permanent magnet is incorporated in the spindle at a suitable location, said permanent magnet causing then the desired change of signal in the sensor. A plurality of such magnets can preferably be and should preferably be incorporated in the spindle around the circumference thereof so as to increase the resolution of the measurement.

In order to achieve a particularly precise measurement, the present invention additionally suggests that the sensor should be arranged above one of the ball bearings shown in FIG. 1, i.e. again outside of the wet chamber, and that the balls of the respective ball bearing should be sampled by a sensor. The resolution of the measurement is then proportional to the number of balls rotating in said ball bearing.

Referring to FIG. 1, according to a further preferred embodiment of the present invention, the volumeter additionally includes a pressure sensor 112 in the vicinity of the flow-in flange 10 and another pressure sensor 113 in the vicinity of the discharge flange 11; by means of this pressure sensor, the pressure difference existing in the volumeter can be measured. On the basis of the pressure difference detected, it is possible to determine, among other measured quantities, the viscosity of the medium flowing through the volumeter; this measured quantity can then be used for switching over to the table set corresponding to the detected viscosity in the table means 22 shown in FIG. 5. Alternatively, also a single differential pressure sensor can be used instead of the above-mentioned two pressure sensors.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus for measuring the volume of flowing media, said apparatus comprising:
    a housing including at least two partially merging longitudinal bores, the axes of which are parallel;
    multiple-thread, interengaging screw-spindles, each spindle supported in a freely rotatable manner within said bores;
    at least one sensor means for responding to the revolutions of one of said screw spindles and providing pulses whose time sequence represents the instantaneous angular speed of said one spindle;
    pulse interval measuring means for measuring intervals between the pulses supplied by said sensor means;
    storage means for storing an empirically determined correlation between the flow velocity of the medium flowing through the apparatus and pulse intervals;
    means for providing different volume values, in each case on the basis of the pulse interval measured by the pulse interval measuring means and on the basis of the correlation between flow velocity and pulse intervals stored in the storage means, the volume value provided being a measure of the volume flowing through the apparatus between pulses; and
    means for adding the values successively provided by said providing means so as to obtain a total volume values which is the decisive value for the volume measurement.

2. The apparatus according to claim 1, in which:
    said storing means and the means for providing are defined by a table means, the various fundamental volume values being stored at predetermined addresses and being addressed and read according to the respective pulse interval measured so that the above-mentioned empirically determined correlation is represented by the allocation carried out between the measured pulse interval and the volume value.

3. The apparatus according to claim 2, in which said table means is realized by a suitably programmed ROM.

4. The apparatus according to claim 1, in which at least the adder means is realized by means of a microprocessor.

5. The apparatus according to claim 1, further including a display means for displaying a measured value and said measured value corresponding either to the total volume value produced or to a value that is proportional thereto.

6. The apparatus according to claim 2 in which said table means has stored therein different table sets which are each optimized to a specific flowing medium as well as to operating conditions prevailing during the measurement, and that a means is provided for selecting the respective suitable table set for the measurement.

7. The apparatus according to claim 6, in which table sets are provided at least for one of different temperatures and different media viscosities.

8. The apparatus according to claim 6, in which table sets are provided for different types of fuel.

9. The apparatus according to claim 1, further including a temperature sensor, which detects the temperature prevailing in the flowing media.

10. The apparatus according to claim 1 further including two pressure sensors measuring the differential pressure occurring in said apparatus and that means are additionally provided for determining the viscosity of the flowing medium on the basis of the differential pressure measured.

11. The apparatus according to claim 1 further includes input means for inputting the operating parameters which are the relevant parameters for the measurement.

12. The apparatus according to claim 1 in which said sensor means comprises at least one Hall sensor which is arranged such that said sensor does not come into contact with the flowing medium and that said sensor detects the spindle revolution through the material of said housing.

13. The apparatus according to claim 1 further comprises:
    ball bearings supporting said spindles; and
    said sensor means detecting the spindle revolution on the basis of the movement of balls in said ball bearings supporting one of said spindles.

14. The apparatus according to claim 13, in which said sensor means comprises a Hall sensor and that the balls of said ball bearings are magnetized.

15. A method of measuring the volume of flowing media, especially of fuel, by means of a screw spindle volumeter, said method comprising the following steps:
    detecting the revolutions of a screw spindle by means of a sensor and producing pulses whose time sequence is representative of the angular speed of the screw spindle;
    repeatedly measuring the period of time between successive pulses;
    selecting, in dependence upon the respective period of time measured, a volume value predetermined for said period of time, said volume value being representative of the volume flowing through the volumeter per predetermined revolution angle of said spindle at the respective angular speed of the spindle;

adding the volume values which have successively been selected for various time period measurements; and producing and displaying a total volume value that is based on the sum obtained during the whole volume measurement by continuously adding the volume values.

16. A method according to claim 15, in which the selected volume values are each representative of the volume flowing through the volumeter in the course of one complete revolution of the screw spindle at the respective angular speed of the screw spindle.

17. A method according to claim 15, in which the sum obtained by adding the selected volume values is directly displayed as result of the volume measurement.

18. A method according to claim 15, in which a plurality of pulses are produced by the sensor in the course of one complete revolution of the spindle.

19. A method according to claim 15, in which a Hall sensor is used by means of which the spindle revolution is detected through a housing wall of the volumeter.

* * * * *